US012415288B2

(12) United States Patent
Burghardt et al.

(10) Patent No.: US 12,415,288 B2
(45) Date of Patent: Sep. 16, 2025

(54) HAIR REMOVAL DEVICE

(71) Applicant: Braun GmbH, Kronberg (DE)

(72) Inventors: Renata Burghardt, Kronberg (DE); Jan Laske, Eppstein (DE); Anja Weigel, Idstein (DE); Reinhold Eichhorn, Idstein (DE)

(73) Assignee: Braun GMBH, Kronberg (DE)

( * ) Notice: Subject to any disclaimer, the term of this patent is extended or adjusted under 35 U.S.C. 154(b) by 559 days.

(21) Appl. No.: 17/875,504

(22) Filed: Jul. 28, 2022

(65) Prior Publication Data

US 2023/0033365 A1 Feb. 2, 2023

(30) Foreign Application Priority Data

Jul. 29, 2021 (EP) .................................... 21188460

(51) Int. Cl.

*B26B 19/10* (2006.01)
*B26B 19/14* (2006.01)
*B26B 19/20* (2006.01)

(52) U.S. Cl.

CPC ............ *B26B 19/10* (2013.01); *B26B 19/145* (2013.01); *B26B 19/205* (2013.01)

(58) Field of Classification Search

CPC .......... B26B 19/10; B26B 19/102–104; B26B 19/143–145; B26B 19/00

See application file for complete search history.

(56) References Cited

U.S. PATENT DOCUMENTS

| | | | | |
|---|---|---|---|---|
| 2,195,609 A | 4/1940 | Mathew | | |
| 2,298,962 A * | 10/1942 | Murphy | ................ | B26B 19/042 30/346.51 |
| 2,325,267 A * | 7/1943 | Murphy | ................ | B26B 19/042 24/561 |
| 2,706,332 A | 4/1955 | Louise | | |

(Continued)

FOREIGN PATENT DOCUMENTS

EP 2425939 A1 3/2012

OTHER PUBLICATIONS

Extended EP Search Report and Search Opinion for 21188460.6 dated Jan. 19, 2022, 9 pages.

(Continued)

*Primary Examiner* — Adam J Eiseman
*Assistant Examiner* — Richard D Crosby, Jr.
(74) *Attorney, Agent, or Firm* — Gerd Zetterer

(57) ABSTRACT

The present invention relates to a hair removal device, in particular a hair trimmer or a shaver or a hair trimmer portion of a shaver, comprising a handle with a motor and a hair removal head, said hair removal head being provided with at least a first hair cutting unit with an outer blade and an inner blade, said inner blade being reciprocally moveable along a first axis relative to the outer blade, wherein said outer blade comprises a row of teeth cooperating with said inner blade for cutting hair. At an outer border first and second skin support surfaces are provided. The skin sides of tooth tips are provided below or on same level as at least one of said first and second skin support surface in a direction towards said handle or said skin sides of said tooth tips are configured such to not cross or extend beyond a connecting line parallel to said second axis between said first and second skin support surfaces.

17 Claims, 5 Drawing Sheets

A-A

(56) References Cited

U.S. PATENT DOCUMENTS

| | | | | |
|---|---|---|---|---|
| 5,669,138 | A * | 9/1997 | Wetzel | B26B 19/042<br>30/43.6 |
| 5,909,929 | A | 6/1999 | Chen | |
| 6,293,017 | B1 * | 9/2001 | Sato | B26B 19/10<br>30/346.51 |
| 7,464,471 | B2 * | 12/2008 | Fukutani | B26B 19/10<br>30/43.92 |
| 8,141,254 | B2 * | 3/2012 | Shimizu | B26B 19/10<br>30/43 |
| 8,555,509 | B2 * | 10/2013 | Pohl | B26B 19/14<br>30/43.92 |
| 9,044,868 | B2 | 6/2015 | Eichhorn et al. | |
| 9,156,173 | B2 * | 10/2015 | Fuerst | B26B 19/06 |
| 9,592,613 | B2 * | 3/2017 | Pohl | B26B 19/06 |
| 11,745,366 | B2 * | 9/2023 | Okura | B26B 19/10<br>30/32 |
| 2008/0040935 | A1 * | 2/2008 | Gratz | B26B 19/20<br>30/346.51 |
| 2011/0209350 | A1 * | 9/2011 | Eichhorn | B26B 19/042<br>30/43.7 |

OTHER PUBLICATIONS

Extended EP Search Report and Search Opinion for 22187421.7 dated Nov. 30, 2022, 8 pages.

* cited by examiner

D1

A-A

HAIR REMOVAL DEVICE

FIELD OF THE INVENTION

This invention relates to a hair removal device, in particular a hair trimmer or a shaver or a hair trimmer portion of a shaver, comprising a handle with a motor and a hair removal head, said hair removal head being provided with at least a first hair cutting unit with an outer blade and an inner blade, said inner blade being reciprocally moveable along a first axis relative to the outer blade, wherein said outer blade comprises a row of teeth cooperating with said inner blade for cutting hair, each of the teeth having a longitudinal extension from a tooth base to a tooth tip parallel to a second axis which is orthogonal to the first axis, a third axis being defined as orthogonal to the first and the second axis, wherein the tooth bases are interconnected with adjacent tooth bases and forming a row of tooth bases, said row of teeth being provided with a row of tooth tips, further comprising first and a second skin support surfaces opposing each other, with a gap between both first and a second skin support surfaces and being provided for skin contact, said first skin support surface being located closer to and adjacent to the row of tooth bases and more remote to the row of tooth tips and said second skin support surface being located closer to said row of tooth tips and more remote to the row of tooth bases, and wherein said teeth and tooth tips are provided with a skin side intended to be facing the user's skin and an opposite teeth inward side facing the inner blade.

BACKGROUND OF THE INVENTION

It is widely known to remove the hair by hair cutting devices which are provided with a stationary outer blade facing the skin and a moveable, motor driven inner blade. Hair Trimmers or hair clippers usually comprise one or two rows of hair cutting teeth and are able to cut longer hairs, which are longer than the thickness of the outer blade. Shavers are understood to cut the hair shorter so that the skin becomes similarly smooth as after usage of a wet razor. Most electric shavers comprise more than one cutting unit. So that two or more cutting units are arranged side by side, e.g. one for short hair shaving and one specialized for long hair trimming.

EP2425939A1 is directed to a long hair trimming unit as part of an electric shaver. Here, two rows of outer comb teeth as part of the stationary blade are facing each other and are thus directed inwardly and are thus separated by a hair capturing gap between both (as opposed to the more traditional style of having the row(s) of comb teeth being directed outwardly with no gap between both and having the teeth tips facing away from each other). As the teeth of the comb elements are upwardly elevated towards the skin the hair lifting performance for flat lying hair, which can be found specifically in the neck area is an improvement to the earlier existing trimmer units.

SUMMARY OF THE INVENTION

It is an objective underlying the present invention to provide a hair removal device that is further improved. A more particular objective underlying the invention is to provide for a hair removal device which is further improved with respect to the ability to lift and cut flat lying hair while further improving on the avoidance of skin irritations.

This objective is addressed by a hair removal device, in particular a hair trimmer or a shaver or a hair trimmer portion of a shaver, comprising a handle with a motor and a hair removal head, said hair removal head being provided with at least a first hair cutting unit with an outer blade and an inner blade, said inner blade being reciprocally moveable along a first axis relative to the outer blade, wherein said outer blade comprises a row of teeth cooperating with said inner blade for cutting hair, each of the teeth having a longitudinal extension from a tooth base to a tooth tip parallel to a second axis which is orthogonal to the first axis, a third axis being defined as orthogonal to the first and the second axis, wherein the tooth bases are interconnected with adjacent tooth bases and forming a row of tooth bases, said row of teeth being provided with a row of tooth tips, further comprising first and second skin support surfaces opposing each other, with a gap between both first and a second skin support surfaces and being provided for skin contact, said first skin support surface being located closer to and adjacent to the row of tooth bases and more remote to the row of tooth tips and said second skin support surface being located closer to said row tooth tips and more remote to the row of tooth bases, and wherein said teeth and tooth tips are provided with a skin side intended to be facing the user's skin and an opposite teeth inward side facing the inner blade, wherein said skin sides of said tooth tips are provided below or on same level as at least one of said first and second skin support surface in a direction parallel to the third axis and towards said handle and/or said skin sides of said tooth tips are configured such to not cross or extend beyond a connecting line parallel to said second axis between said first and second skin support surfaces.

By providing tooth tips which do not project beyond the outer border of the skin support surfaces it has been found that the likelihood that tooth tips may enter into the hair canal is decreased and thus skin irritations are avoided. Further surprisingly, it was found that the hair lifting capability of very flat lying hair is increased by this design compared to existing prior art hair trimers or hair removal devices.

This objective is also addressed by a hair removal device, in particular a hair trimmer or a shaver or a hair trimmer portion of a shaver, comprising a handle with a motor and a hair removal head, said hair removal head being provided with at least a first hair cutting unit with an outer blade and an inner blade, said inner blade being reciprocally moveable along a first axis relative to the outer blade, wherein said outer blade comprises a row of teeth cooperating with said inner blade for cutting hair, each of the teeth having a longitudinal extension from a tooth base to a tooth tip parallel to a second axis which is orthogonal to the first axis, a third axis being defined as orthogonal to the first and the second axis, wherein the tooth bases are interconnected with adjacent tooth bases and forming a row of tooth bases, said row of teeth being provided with a row of tooth tips, and wherein said teeth and tooth tips are provided with a skin side intended to be facing the user's skin and an opposite teeth inward side facing the inner blade wherein said skin side of said teeth extend from tooth bases to tooth tips parallel to said second axis or in a curved and indented contour shape towards the inner blade relative to a line parallel to said second axis.

Thus, by providing at least a flat horizontal extension of the skin surface side of the teeth or by an indentation/curvature or concave curvature of the skin side of the teeth both avoidance of skin irritations and excellent hair lifting and hair cutting of very flat lying hair can be achieved. The teeth are less likely to enter the hair canal. The terms "concave" or "convex" do not require in this context a constant radii or circle segment and may cover also similar curved shapes that are either inwardly (for concave) or outwardly (for convex) curved.

It is to be understood that referral to a row of teeth of the outer or inner blade hereinabove and below may encompass at least three neighboring teeth but not necessarily the complete row of teeth. Such referral to a row of teeth may be provided by a comb like structure, so that teeth and adjacent slots or openings alternate. "A" row means here at least one row of teeth of the inner and outer blades. Both the inner and the outer blade are provided with such a comb like structure with sharpened teeth side edges for cutting hair according to the scissor principle. The outer blade is preferably stationary and non-moveable, and the inner blade is provided to reciprocate relative to the outer blade. Tooth bases of a tooth may be defined to start next to the location where the teeth start to get separated in a comb like structure, so where adjacent slots separating the teeth also start.

Further advantageous aspects are provided by the features of the subclaims.

DETAILED DESCRIPTION OF THE INVENTION

Figure 1:
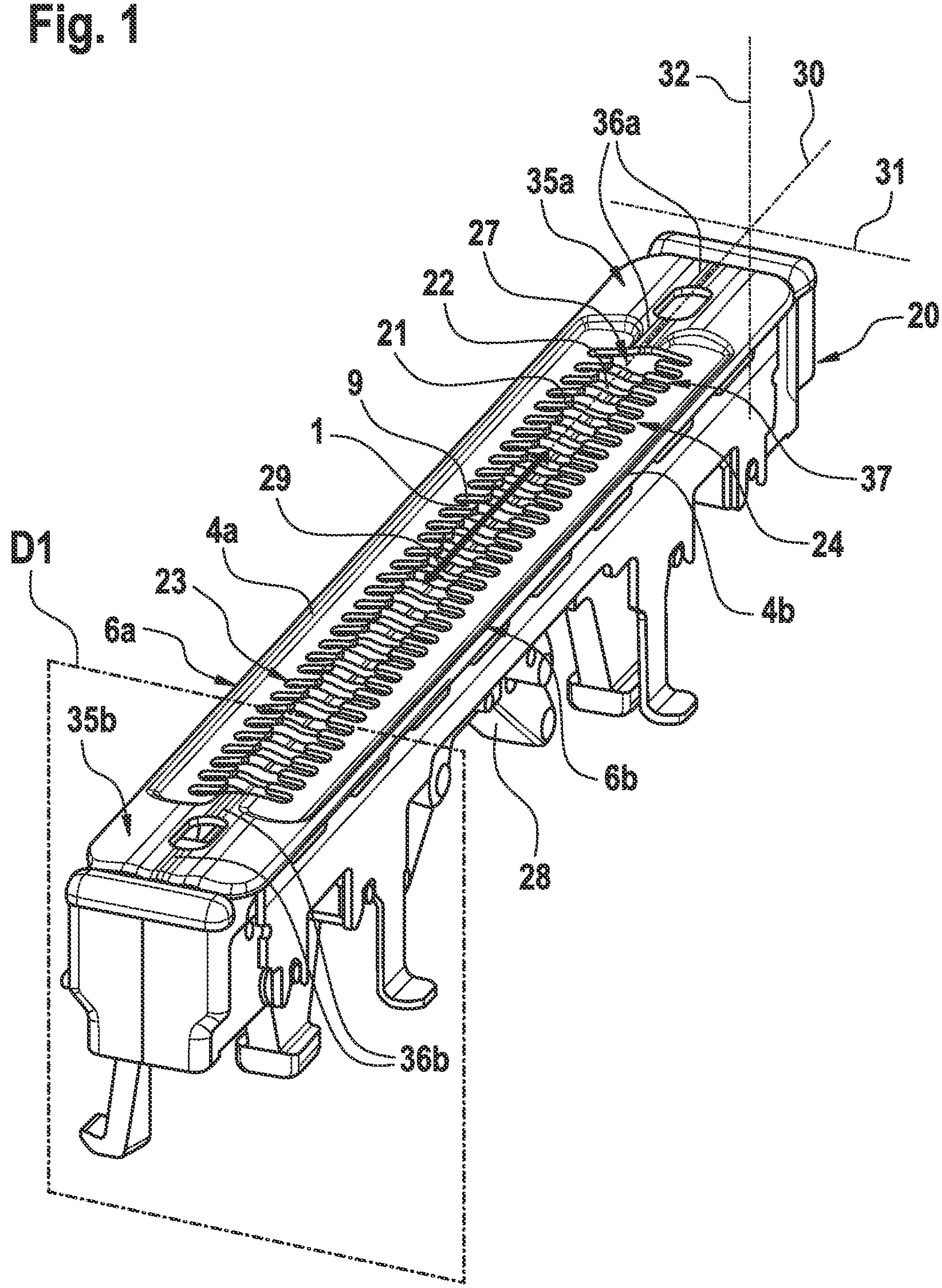
FIG. 1: a perspective view of a hair trimmer unit of a shaver device.

The figures show a hair removal device, in particular a hair trimmer or a shaver or a hair trimmer portion of a shaver, comprising a handle with a motor and a hair removal head, said hair removal head being provided with at least a first hair cutting unit with an outer blade and an inner blade, said inner blade being reciprocally moveable along a first axis relative to the outer blade, wherein said outer blade comprises a row of teeth cooperating with said inner blade for cutting hair, each of the teeth having a longitudinal extension from a tooth base to a tooth tip parallel to a second axis which is orthogonal to the first axis, a third axis being defined as orthogonal to the first and the second axis, wherein the tooth bases are interconnected with adjacent tooth bases and forming a row of tooth bases, said row of teeth being provided with a row of tooth tips, further comprising first and a second skin support surfaces opposing each other, with a gap between both first and a second skin support surfaces and being provided for skin contact, said first skin support surface being located closer to and adjacent to the row of tooth bases and more remote to the row of tooth tips and said second skin support surface being located closer to said row of tooth tips and more remote to the row of tooth bases, and wherein said teeth and tooth tips are provided with a skin side intended to be facing the user's skin and opposite teeth inward side facing the inner blade wherein said skin sides of said tooth tips are provided below or on same level as at least one of said first and second skin support surface in a direction parallel to the third axis and towards said handle and/or said skin sides of said tooth tips are configured such to not cross or extend beyond a connecting line parallel to said second axis between said first and second skin support surfaces. Said skin side of said tooth tips is at least partly concave shaped. The terms first and second skin support surface refers to portions which are located closest to the skin or in other words most remote from the handle in a vertical direction along the third axis. The term tooth tips refer to that portion of the tooth tip which faces away from the inner blade, so belongs to the skin side thereof and forms a free end of the tooth. By this above relative vertical height position along the third axis between first and second skin support surfaces project more towards the skin or are on same vertical height level as the tooth tips. The first and second skin support surfaces are preferably either part of the first hair cutting unit and more preferably a portion of the outer blade part or part of guard member (s) located directly adjacent to the first hair cutting unit.

According to an aspect is the at least one of the first and second skin support surface provided such/configured that a height difference (h) relative to the skin side of the tooth tips is between 0 to 1 mm or preferably between 0 to 0.5 mm. Further optionally, at least one of the first and second skin support surface is provided such that a height difference (h) relative to the skin side of the tooth tips is between 0.005 to 0.1 mm. More preferably the height difference is in the range of 0.005 mm to 0.005 mm or 0 to 0.003 mm. It revealed that this rather small projection of the first and/or second skin surface relative to the skin side of the tooth tips significantly reduces skin irritations. During shaving strokes, the skin may be stretched over the first and second skin support surfaces and the tooth tips are, despite being at a lower vertical level still able to capture flat lying hairs.

According to a further aspect are said tooth tips less than 0.3 mm or less than 0.2 mm thick in a direction parallel to the third axis and less than 0.6 mm or less than 0.5 mm wide in a direction parallel to the first axis. As measured from the outermost point of the tooth tip 0.225 mm towards the tooth base in a direction parallel to the second axis. This contributes as well to good hair lifting capabilities. Such rather small, dimensioned tooth in the tip area may be detrimental to the desire of avoiding skin irritations as those might be sometimes prone to enter the hair canal, however the provision of skin support surface(s) which are vertically higher than the tooth tips at its skin side assure that skin irritations are not caused.

The teeth are configured such that the length of the teeth from tooth base to tooth tip along its longitudinal extension parallel to the second axis is less than 3 mm, less than 2 mm or less than 1 mm.

According to another aspect extends a contour line at the skin side between said first skin support surface and said tooth tips parallel to the second axis and comprises a convexly curved portion at the first skin support surface and a concavely curved portion at the skin side of the teeth and/or wherein the skin side of the teeth comprise an indentation. The contour line at the skin side between said first skin support surface and said tooth tips is viewed in a cross-sectional plane along parallels to the second and the third axis. As a consequence of such a contour line, the first skin support surface is a curved or outwardly bulging portion which provides soft skin feeling due to its curvature and this curvature is then changed to the opposite as inwardly bulging or as a curved indentation along the further extension of the teeth from tooth bases to tooth tips. The skin side of the teeth are pitchfork or hayfork shaped. Thus, hair can be as easily lifted.

According to a further aspect, a distance d along a line parallel to the second axis between the tooth tips and the second skin support surface is between 1 and 2.5 mm. Within this distance there is provided a gap and optionally a second row of teeth for the outer blade. So, this distance refers to the second skin support surface and the tooth tip which is separated by the gap 27 (and optionally a further row of teeth) between both and not to the distance between the first skin support surface which is adjacent a tooth base belonging to the tooth tip of the same teeth of the same side. The outer blade comprises two rows of teeth with the tooth bases facing away from each other and wherein adjacent teeth of one row are separated by slots between adjacent teeth. A gap separates both rows of teeth at its facing tooth tips of the outer blade. The tooth bases are connected to each other within one row of teeth.

According to another aspect both rows of teeth of the outer blade are offset to each other so that the tooth tips of the one row of teeth is facing slots of the opposing row of teeth. Optionally, the skin side shape is the same for all teeth of both rows of teeth of the outer blade.

According to yet another aspect is the outer blade made from one sheet metal and/or sheet steel part and the first and second skin support surfaces extend at both outer border portions parallel to the first axis and the extension of the rows of teeth as part of said outer blade in-between said first and second skin support surfaces.

Alternatively, the first skin support surface forms part of the outer blade at an outer border portion extending parallel to the first axis and the second skin support surface is configured as guard member extending also parallel to the first axis. Such guard member providing the second skin support surface may be separate from the outer blade but directly adjacent to that. It may be e.g. flat or curved or rip/bar shaped with a longitudinal extension parallel to the first axis. Thus the trimmer is configured to work in just one movement direction of the device over the skin, opposite to the above configuration with two opposing rows of teeth at the outer blade.

According to another aspect is said hair removal device (effective as) a hair trimmer which is a portion of a shaver treatment head/hair removal head comprising at least two further hair cutting units, all side by side, each being designed differently to the other and/or having different hair cutting blade units.

According to an aspect a hair removal device is provided, in particular a hair trimmer or a shaver or a hair trimmer portion of a shaver, comprising a handle with a motor and a hair removal head, said hair removal head being provided with at least a first hair cutting unit with an outer blade and an inner blade, said inner blade being reciprocally moveable along a first axis relative to the outer blade, wherein said outer blade comprises a row of teeth cooperating with said inner blade for cutting hair, each of the teeth having a longitudinal extension from a tooth base to a tooth tip parallel to a second axis which is orthogonal to the first axis, a third axis being defined as orthogonal to the first and the second axis, wherein the tooth bases are interconnected with adjacent tooth bases and forming a row of tooth bases, said row of teeth being provided with a row of tooth tips, further comprising first and a second skin support surfaces opposing each other, with a gap between both first and a second skin support surfaces and being provided for skin contact, said first skin support surface being located closer to and adjacent to the row of tooth bases and more remote to the row of tooth tips and said second skin surface being located closer to said row tooth tips and more remote to the row of tooth bases, and wherein said teeth and tooth tips are provided with a skin side intended to be facing the user's skin and an opposite teeth inward side facing the inner blade wherein said skin side of said teeth extend from tooth bases to tooth tips parallel to said second axis or curved relative to a line parallel to said second axis. The curvature is preferably similar to a concave curve shape. The tooth is thus similar to a hay fork shaped at least on its skin side.

Figure 7:
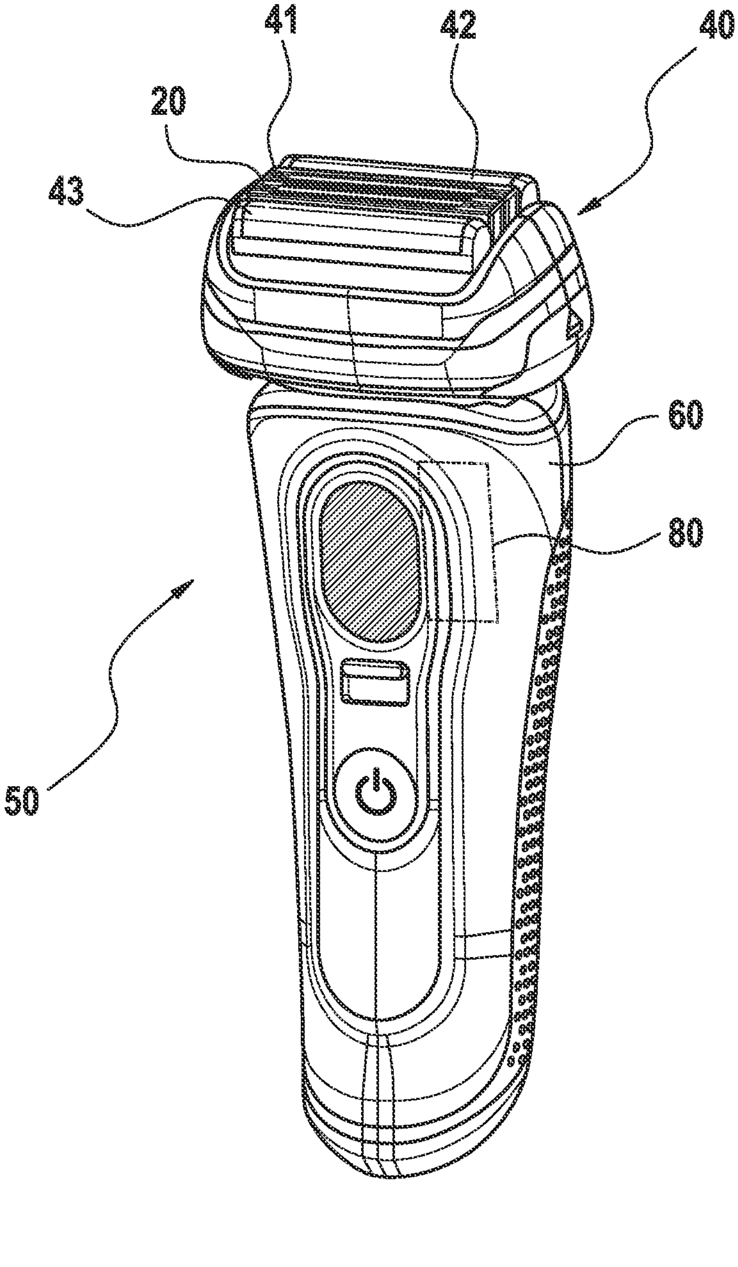
FIG. 7: a perspective view of a hair removal device, in particular shaver comprising a hair trimmer unit of FIG. 1.

According to an aspect extend the inward facing sides of the teeth from tooth bases to tooth tips upwardly in a direction parallel to the third axis away from the handle and/or substantially straight. Thus the inner side of the teeth is shaped straight and upwardly towards the skin along the vertical third axis and the outer, skin side of the teeth is shaped differently to that, i.e. either flat horizontally or with a curved indentation like a hay fork. This upward extension of the inner cutting and moving blade surface facing the inner side of the outer blade assures short hair cutting length while FIG. 1 illustrates a perspective view on a first cutting unit 20 which is also named long hair trimmer cutting unit or long hair trimmer 20 as it is configured to cut also longer hairs. A 3D axis system is shown with the first axis 30 extending in the longitudinal direction of the first cutting unit along the movement direction of the inner blade 22. A second axis 31 extends laterally and perpendicular to the first axis 30. Perpendicular to both the first and the second axis extends in a vertical direction a third axis 32. The first cutting unit 20 is as shown in FIG. 1 a part of a hair removal head 40 of a shaver 50 (cf. FIG. 7). The hair removal head comprises four cutting units: outer foil type short hair cutting units 42, 43 and between both long hair trimmer cutting units 20, 41. Here the short hair cutters are similarly or identical in design with respect to its blades and the long hair trimmers are each different in blade geometry so that different types of long hair can be grasped, lifted, and cut. As further illustrated by FIG. 7, said shaver comprises a handle 60 to which the hair removal head is movably connected, so that said head 40 is able to swivel or pivot relative to the handle 60. Said handle further comprises a motor 70 (only schematically indicated with dashed line as this is inside the housing), of a rotatory or linear motor type, which is connected to the cutting units of the hair removal head 40 in order to drive the inner blades thereof along the first axis 30 (see arrow 29 in FIG. 1 indicating the movement of the inner blade 22). The first hair cutting unit 20 includes a drive coupler 28 for drivable connection with a drive train of the motor 70.

The cutting units 20, 41, 42, 43 may be suspended in the hair removal head 40 to vertically float along axis 32 and/or tilt.

The outer blade 21 of the first cutting unit 20 is a substantially flat steel sheet material which specific comb teeth shape is manufactured by etching and/or PECM (pulsed electrochemical machining). Other manufacturing technologies used for manufacture of shaver blades may be used as well or in the alternative. The outer blade comprises two rows of teeth 23, 24 each arranged like a hair comb with teeth 1 alternating with slots 9. Each tooth 1 has a tooth tip 3 and the rows of teeth 23, 24 are inwardly facing each other so that tooth tips 3 of opposing rows of teeth 23, 24 are facing each other and a gap 27 is separating both rows from each other.

Figure 2:
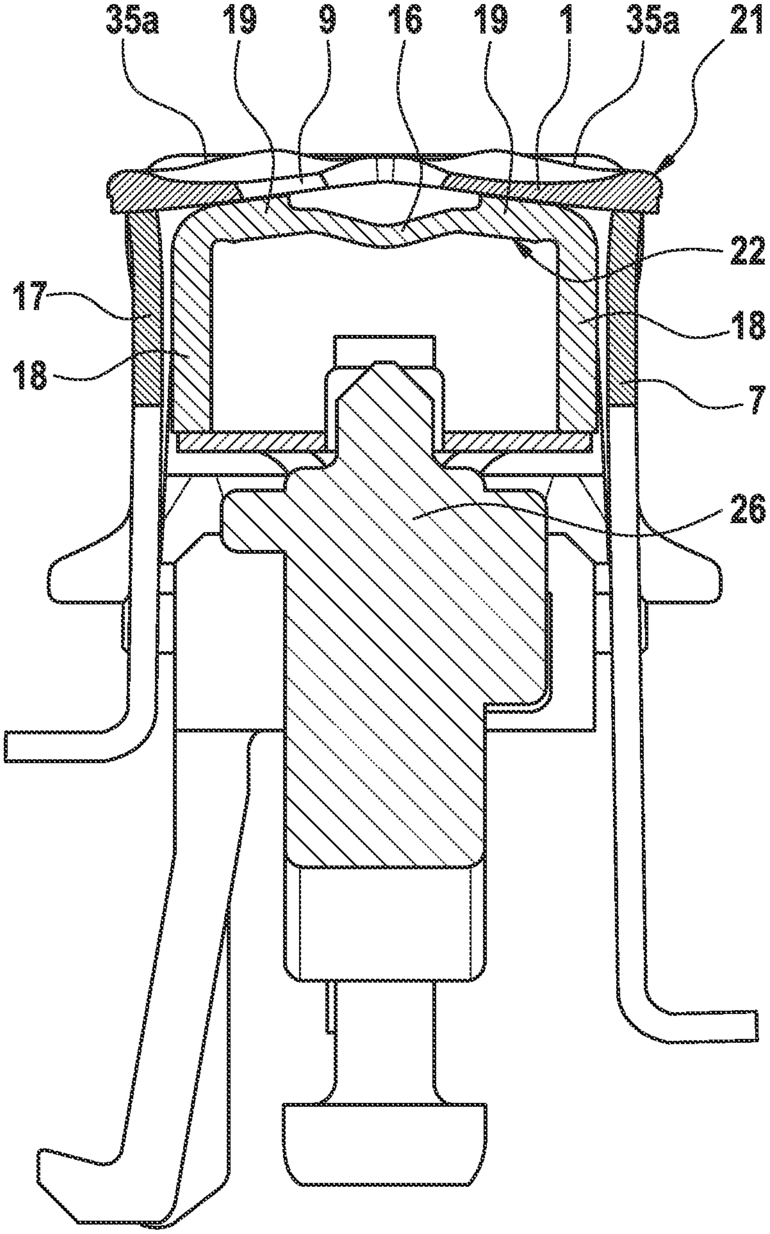
FIG. 2: a cross-sectional detail view of the hair trimmer unit of a shaver device of FIG. 1 when viewed onto the cross-sectional plane D1 in FIG. 1, FIG. 3: a top view onto the device of FIG. 1, FIG. 4: a cross sectional view along line A-A of FIG. 3 in order to illustrate the contour of comb teeth.

FIG. 2 shows a cross section along a plane parallel to the second and third axis in the cut D1 as shown in FIG. 1. The inner blade 22 is sheet steel material that is bent in U-shape; both U-legs 18 serve to guide the inner blade 22 within an outer trimmer housing 17. The connecting part of the U is configured with the inner blade hair cutting portion 19 which is sliced (see FIG. 1) and extends slightly upwardly in a vertical direction and which cutting portions face each other inwardly and are connected by a thinned V-shaped bridge 16. The inner blade 22 is connected with a driver element 26 which is part of the drive train that connects the inner blade with the motor.

The outer blade 21 is provided further away from the handle in vertical direction and is configured to cooperate with the inner blade 22 to provide a hair cutting scissor action. The outer blade 21 is connected with the outer trimmer housing 17 which both encompass the inner blade 22. Per the cross sectional cut of D1 is the outer blade provided in FIG. 2 on the right-side row of teeth with a tooth 1 shown in cross section and a slot or opening 9 on opposing left side row of teeth as both inwardly facing rows of teeth of the outer blade are offset relative to each other along a parallel to the first axis 30.

As can be seen with FIGS. 1 and 2 the outer blade is also provided at both of its longitudinal end portions with non-toothed extensions 35*a*, 35*b* which are elevated towards the skin in vertical direction. In the middle areas along a parallel to the first axis 30 are provided end portion indentations 36*a*, 36*b* which are aligned with the gap 27 provided between both facing rows of teeth of the outer blade. These end portion indentation 36*a*, 36*b* help to guide the skin closer to the gap 27 and contribute thus to a shorter hair cutting length of the long hairs.

At the outer border of the long sides of the outer blade 21 are provided upwardly elevated and outwardly bulging longitudinal bars 6*a*, 6*b* which outermost portions in a vertical direction along a parallel to the third axis 32, away from the handle form first and second skin support surfaces 4*a*, 4*b*. These bars 6*a*, 6*b* and first and second skin support surfaces 4*a*, 4*b* along the long sides of the outer blade 21 and the elevated extensions 35*a*, 35*b* at the short sides of the outer blade 21 form a frame that is elevated towards the skin and that surrounds a central basin 37 which is recessed relative to that frame portions. Within this central basin 37 the two rows of teeth and the gap separating both rows are provided.

Figure 3:
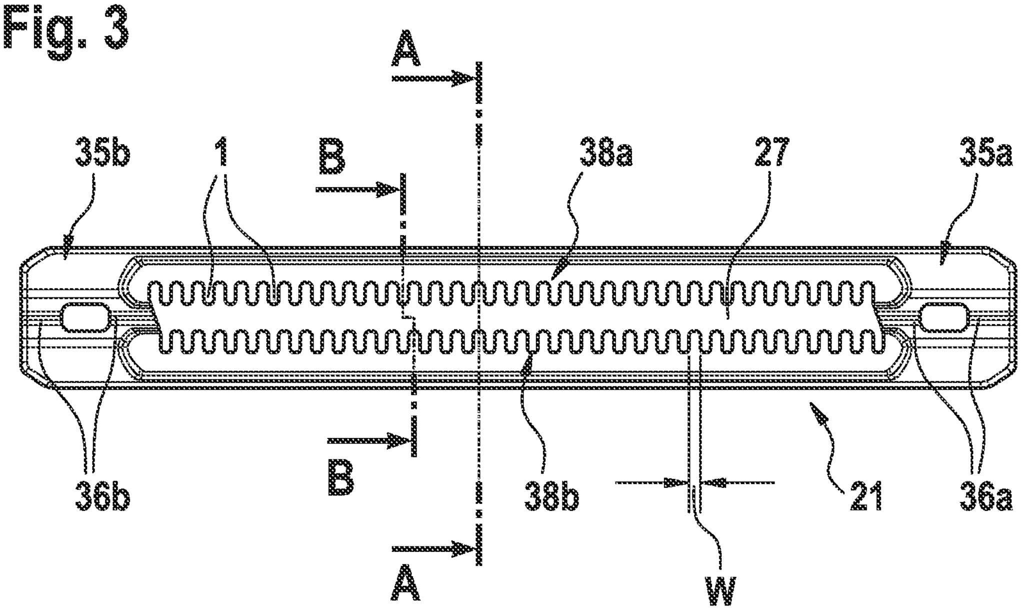

FIG. 3 shows a top view onto the outer blade without the inner blade 22. The outer blade 21 has a substantially rectangular shape with rounded edges. As can be seen the teeth of the first row of teeth 38*a* is offset to the inwardly facing second row of teeth 38*b*, so that each tooth 1 is facing a slot 9 of the opposing row of teeth.

Figure 4:
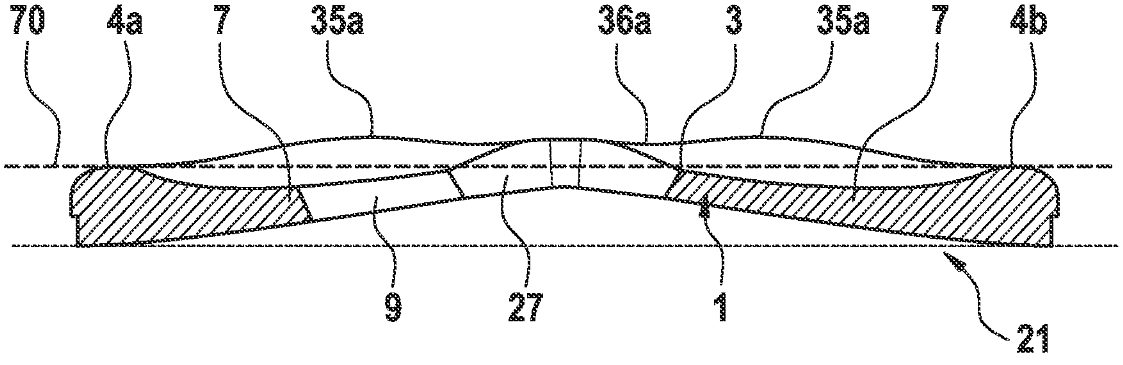

FIG. 4 shows a cross-sectional cut along line A-A in FIG. 3 through a left side of the outer blade 21 with a slot 9 and a right side of the outer blade 21 with a tooth 1. The outer blade 21 has a skin facing side—the upper side in FIG. 4—and on its opposite side an inner blade facing side. Each tooth 1 has a tooth base or tooth root 7 and extends towards its free end on the skin side to a tooth tip 3. The edges of the teeth 1 towards the inner blade facing side are provided with the sharp cutting edges for cutting the hair in cooperation with the moving inner blade. The inner blade facing side is substantially reverse V-shaped, with a gap 27 in the theoretically connecting portion of the V. Thus, the inner blade facing side of the teeth 1 are planar, and in cross-section straight lines and extend upwardly from tooth base to an inner blade side of the tooth tip.

The outer skin side contour of the outer blade 21 starts at the left side first row of teeth with a convex rounding in the area of the skin support surfaces and then changes its kind of curvature from outwardly or convexly curved to inwardly concavely curved in a direction towards the tooth tip. The same contour is then mirrored at the opposite teeth belonging to the second tow of teeth with the gap 27 between both. This hay fork shape of the skin side of the teeth 1 in its longitudinal teeth extension is beneficial for good hair lifting.

As can be seen by dashed line 70 in FIG. 4 which connects the vertically outermost points of bars 6*a*, 6*b*, i.e. the skin support surfaces 4*a*, 4*b*, the skin side of tooth tip 3 is below that level of the dashed line 70 and does not cross same or extend beyond this.

Figure 5:
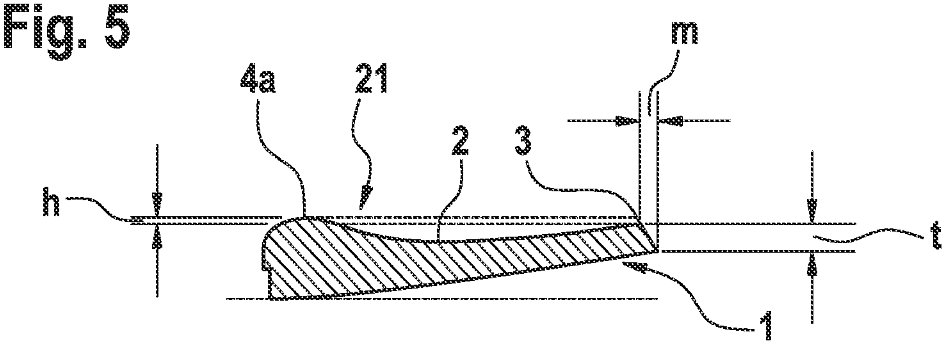
FIG. 5: a cross-sectional detail view similar to FIG. 4 in order to illustrate the contour of comb teeth, the skin support surface and the height difference between the skin support surface and the tooth tip.

FIG. 5 shows schematically the cross section of a single tooth 1 together with the part of the outer blade that comprises the bar 6*a* and first skin support surface 4*a*. Here also the vertical height difference h between the first skin support surface 4*a* and the skin side of the tooth tip 3 is illustrated therein with the tooth tip being vertically below the first skin surface. The height difference h is between 0 and 1 mm or between 0 and 0.5 mm or between 0.005 and 0.1 mm or between 0.005 mm and 0.05 mm or between 0 and 0.04 mm or between 0.005 and 0.03 mm. The tooth tips do have a thickness t of less than 0.3 mm or less than 0.22 mm or less than 0.2 mm. The tooth width w (see FIG. 3) is less than 0.6 mm or less than 0.5 mm but more than 0.3 mm or more than 0.35 mm. All those values for t and w are to be measured at a depth m of 0.225 mm from the outermost tooth tip towards the tooth base along the longitudinal tooth extension or along a parallel to the second axis.

The gap 27 has an opening width between the tooth tips 3 of the first row of teeth 23 and the second row of teeth 24 which preferably ranges between 0.9 and 1.3 mm along a parallel to the second axis 31 or parallel to the longitudinal extension of the teeth 1. The teeth 1 have preferably a longitudinal extension along a parallel to the second axis 31 of less than 1.2 mm or less than 1 mm.

Figure 6A:
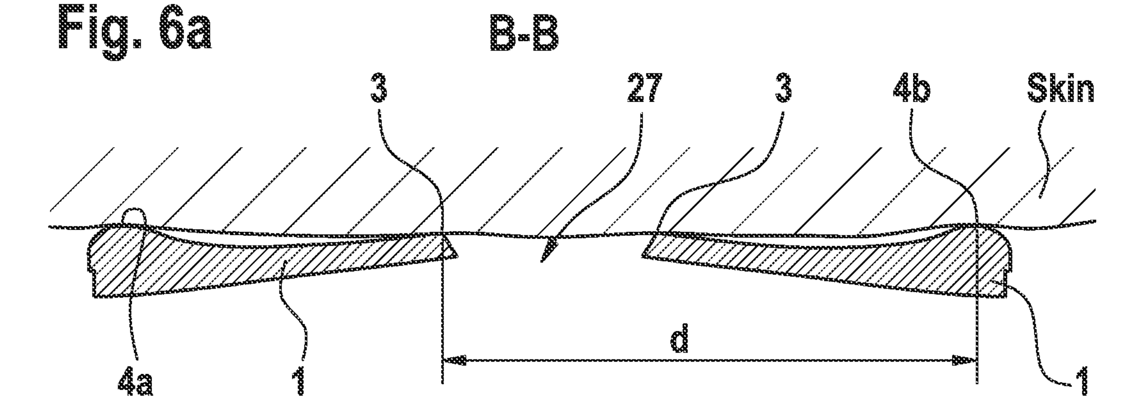
FIG. 6*a*: a schematic cross-sectional view similar to FIG. 4 showing the skin support.

FIG. 6*a* illustrates the interaction of two teeth with facing tooth tips along cross section B-B in FIG. 3 with the skin (located above the outer blade in FIG. 6*a*) according to the outer blade design as described above. As can be seen from FIG. 6*a* during a shaving stroke movement in one of the directions along a parallel to the second axis the skin gets stretched between the protruding skin first and second skin support surfaces 4*a*, 4*b* but is still in comfortable contact with the tooth tips 3 so that flat lying hair can be grasped, lifted and cut when those hairs have entered the gap 27 and are then directed to the slots 9 between teeth 1.

Figure 6B:
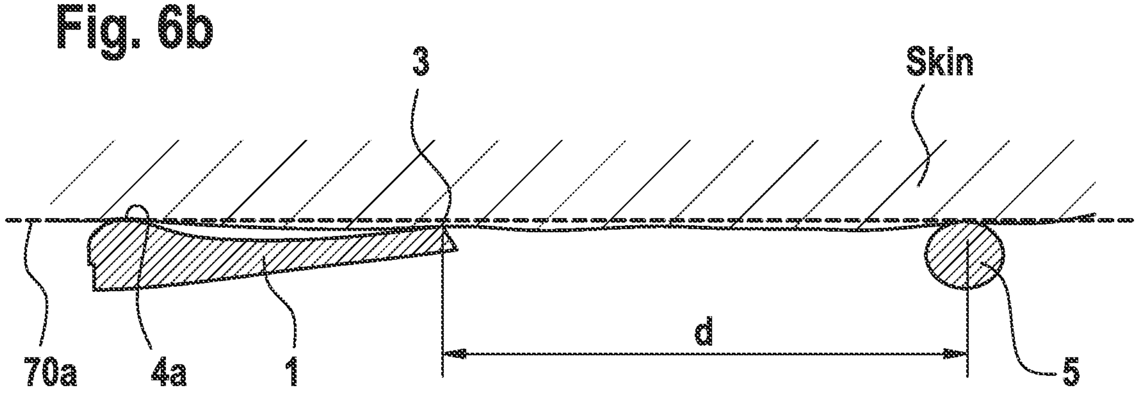
FIG. 6*b*: a schematic cross-sectional view similar to FIG. 4 showing the skin support.

FIG. 6*b* illustrates one alternative according to which a first skin support surface 4*a* is provided by a part of the outer blade having a first row of teeth and no second row of teeth having facing teeth tips facing the teeth tips of the first row is provided. There might be still a second row of teeth but also outwardly oriented at the outer blade. In order to provide a second skin support surface a guard member 5 is provided facing the tooth tips 3. The distance d between the skin side of the tooth tip and the guard 5 (which refers also to the vertically seen outermost skin side thereof) may be between 0.4 mm and 2.5 mm or between 1.3 and 2.5 mm. By this the guard prevents direct scratching of the tooth tip along the skin and entering into a hair canal while the skin can be still stretched over a first and second skin contact surface 4*a* and 5. Also here a dashed line 70*a* indicates a theoretically connecting line of the guard and the first skin contact surface and shows that the skin side of the tooth tip 3 is below that in a vertical direction.

Figure 6C:
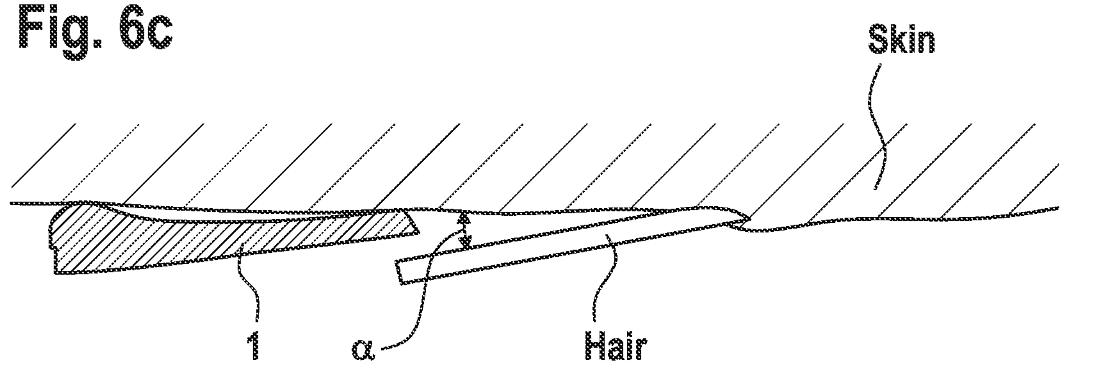
FIG. 6*c*: a schematic cross-sectional view similar to FIG. 4 showing the skin support

FIG. 6*c* shows schematically the interaction between flat lying hair of a skin and a tooth of an outer blade per one of the above-described designs. Hair may be even as flat laying on the skin as alpha=10 degree or less which is not unusual for the male neck area. As can be seen the concavely curved skin side of the teeth which creates an upwardly pointing tooth tip may be effective similar to a hay fork and lift even those flat lying hairs. The slightly lowered tooth tip level relative to a stretched skin between two opposing first and second skin contact surfaces advantageously contributes to that.

It is to be noted that despite none of the FIGS. 3 to 6*c* shows the inner blade or other parts of the hair trimmer or hair removal device all those parts not visualized are provided as known from the prior art or as described above in the context of FIGS. 1, 2 and 7.

It is to be noted that despite these illustrations in the FIGS. in the context of a dry electric shaver comprising a long hair trimmer first cutting unit, the hair removal device can be of a different type as well, with e.g. just one row of cooperating cutting teeth as with trimmers or clipper devices or with two rows of cooperating cutting teeth with the teeth tips facing away from each other or in a different variant. In case of the variant with outwardly facing teeth a guard needs to be provided per FIG. 6*b* for one or both rows of teeth of the outer blade.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as “40 mm” is intended to mean “about 40 mm.”

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A hair removal device comprising a handle with a motor and a hair removal head said hair removal head being provided with at least a first hair cutting unit with an outer blade and an inner blade, said inner blade being reciprocally moveable along a first axis relative to the outer blade, wherein said outer blade comprises a row of teeth cooperating with said inner blade for cutting hair, each of the teeth having a longitudinal extension from a tooth base to a tooth tip parallel to a second axis which is orthogonal to the first axis, a third axis being defined as orthogonal to the first and the second axis, wherein the tooth bases are interconnected with adjacent tooth bases and forming a row of tooth bases, said row of teeth being provided with a row of tooth tips, including a first and a second skin support surface opposing each other, with a gap between both the first and the second skin support surface and being provided for skin contact, said first skin support surface being located closer to and adjacent to the row of tooth bases and more remote to the row of tooth tips and said second skin surface being located closer to said row tooth tips and more remote to the row of tooth bases, and wherein said teeth and tooth tips are provided with a skin side intended to be facing the user’s skin and an opposite teeth inward side facing the inner blade, wherein, said skin sides of said tooth tips are provided below as at least one of said first and second skin support surface in a direction parallel to the third axis and towards said handle and/or said skin sides of said tooth tips are configured such to not cross or extend beyond a connecting line parallel to said second axis between said first and second skin support surfaces and wherein a contour line at the skin side between said first skin support surface and said tooth tips extends parallel to the second axis and comprises a concavely curved portion at the skin side of the teeth.

2. The hair removal device according to claim 1, wherein at least one of the first and second skin support surface is provided such that a height difference relative to the skin side of the tooth tips is between 0 to 1 mm.

3. The hair removal device according to claim 2, wherein at least one of the first and second skin support surface is provided such that a height difference (h) relative to the skin side of the tooth tips is between 0.005 to 0.1 mm.

4. The hair removal device according to claim 1, wherein said tooth tips are less than 0.2 mm thick in a direction parallel to the third axis and less than 0.5 mm wide in a direction parallel to the first axis as measured from the outermost point of the tooth tip 0.225 mm towards the tooth base in a direction parallel to the second axis.

5. The hair removal device according to claim 1, wherein the teeth are configured such that the length of the teeth from tooth base to tooth tip along its longitudinal extension parallel to the second axis is less than 3 mm, less than 2 mm or less than 1 mm.

6. The hair removal device according to claim 1, wherein said contour line at the skin side between said first skin support surface and said tooth tips extends parallel to the second axis and comprises a convexly curved portion at the first skin support surface and/or wherein the skin side of the teeth comprise an indentation.

7. The hair removal device according to claim 1, wherein a distance d along a line parallel to the second axis between the tooth tips and the second skin support surface is between 1 and 2.5 mm.

8. The hair removal device according to claim 1, wherein the outer blade comprises two rows of teeth with the tooth bases facing away from each other and wherein adjacent teeth of one row of teeth are separated by slots between adjacent teeth and wherein both rows of teeth are separated by said gap.

9. The hair removal device according claim 8, wherein both rows of teeth of the outer blade are offset to each other so that the tooth tips of the one row of teeth is facing slots of the opposing row of teeth.

10. The hair removal device according to claim 8, wherein the skin side shape is the same for all teeth of both rows of teeth.

11. The hair removal device according to claim 8, wherein the outer blade is made from one sheet steel part and the first and second skin support surfaces extend at both outer border portions parallel to the first axis and the extension of the rows of teeth as part of said outer blade.

12. The hair removal device according to claim 1, wherein the first skin support surface forms part of the outer blade at an outer border portion extending parallel to the first axis and the second skin support surface is configured as a guard member extending also parallel to the first axis, wherein in particular said guard member is convexly shaped at the second skin support surface.

13. The hair removal device according to claim 1, wherein said hair removal device is a hair trimmer which is a portion of a shaver treatment head comprising at least two further hair cutting units, all side by side arranged.

14. The hair removal device according to claim 13, wherein each of the three hair cutting units being designed differently to the other and/or having different hair cutting blade units.

15. A hair removal device comprising a handle with a motor and a hair removal head said hair removal head being provided with at least a first hair cutting unit with an outer blade and an inner blade, said inner blade being reciprocally moveable along a first axis relative to the outer blade, wherein said outer blade comprises a row of teeth cooperating with said inner blade for cutting hair, each of the teeth having a longitudinal extension from a tooth base to a tooth tip parallel to a second axis which is orthogonal to the first axis, a third axis being defined as orthogonal to the first and the second axis, wherein the tooth bases are interconnected with adjacent tooth bases and forming a row of tooth bases, said row of teeth being provided with a row of tooth tips, including a first and a second skin support surface opposing each other, with a gap between both the first and the second skin support surface and being provided for skin contact, said first skin support surface being located closer to and adjacent to the row of tooth bases and more remote to the row of tooth tips and said second skin surface being located closer to said row tooth tips and more remote to the row of tooth bases, and wherein said teeth and tooth tips are provided with a skin side intended to be facing the user's skin and an opposite teeth inward side facing the inner blade wherein said skin side of said teeth extends from tooth bases to tooth tips in a curved contour shape relative to a line parallel to said second axis.

16. The hair removal device according to claim 15, wherein the inward facing side of said teeth facing the inner blade extends from tooth bases to the inner side of the tooth tips upwardly in a direction parallel to the third axis away from the handle and/or substantially straight.

17. The hair removal device according to claim 15, wherein the teeth's skin side is hay fork shaped and/or comprises a concave shaped portion.

* * * * *